US009225916B2

(12) United States Patent
Friel et al.

(10) Patent No.: US 9,225,916 B2
(45) Date of Patent: Dec. 29, 2015

(54) SYSTEM AND METHOD FOR ENHANCING VIDEO IMAGES IN A CONFERENCING ENVIRONMENT

(75) Inventors: Joseph T. Friel, Ardmore, PA (US); J. William Mauchly, Berwyn, PA (US); Dihong Tian, San Jose, CA (US)

(73) Assignee: CISCO TECHNOLOGY, INC., SAN JOSE, CA (US)

( * ) Notice: Subject to any disclaimer, the term of this patent is extended or adjusted under 35 U.S.C. 154(b) by 854 days.

(21) Appl. No.: 12/727,089

(22) Filed: Mar. 18, 2010

(65) Prior Publication Data

US 2011/0228096 A1    Sep. 22, 2011

(51) Int. Cl.
  H04N 7/18     (2006.01)
  H04N 5/33     (2006.01)
  H04N 3/09     (2006.01)

(52) U.S. Cl.
  CPC ............ H04N 5/332 (2013.01); H04N 3/09 (2013.01); H04N 5/33 (2013.01)

(58) Field of Classification Search
  CPC ............ H04N 5/33; H04N 5/332; H04N 3/09
  USPC ......... 348/164, 143, 144, 145, 146, 147, 148, 348/149, 150, 151, 152, 153, 154, 155, 156, 348/157, 158, 159, 160, 161, 162, 163, 165, 348/166, 167, 168, 169
  See application file for complete search history.

(56) References Cited

U.S. PATENT DOCUMENTS

| 2,911,462 A | 11/1959 | Brady |
| D212,798 S | 11/1968 | Dreyfuss |
| 3,793,489 A | 2/1974 | Sank |
| 3,909,121 A | 9/1975 | De Mesquita Cardoso |
| 4,400,724 A | 8/1983 | Fields |
| 4,473,285 A | 9/1984 | Winter |

(Continued)

FOREIGN PATENT DOCUMENTS

| CN | 101383925 A | 3/2009 |
| CN | 101953158 A | 1/2011 |

(Continued)

OTHER PUBLICATIONS

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

(Continued)

*Primary Examiner* — Andy Rao
(74) *Attorney, Agent, or Firm* — Patent Capital Group

(57) ABSTRACT

A method is provided in one example and includes receiving image data for a field of view associated with a display. The image data is used to generate a plurality of red green blue (RGB) frames. The method also includes emitting infrared energy onto the field of view in order to generate a plurality of infrared frames, the plurality of RGB frames and the plurality of infrared frames are generated by a single camera. The plurality of RGB frames can be combined with the plurality of infrared frames in order to generate a video data stream. In a more particular embodiment, the emitting of the infrared energy is synchronized with the camera such that the infrared energy is emitted onto the field of view at one half of an existing frame rate of the camera.

17 Claims, 4 Drawing Sheets

(56) References Cited

U.S. PATENT DOCUMENTS

| | | |
|---|---|---|
| 4,494,144 A | 1/1985 | Brown |
| 4,750,123 A | 6/1988 | Christian |
| 4,815,132 A | 3/1989 | Minami |
| 4,827,253 A | 5/1989 | Maltz |
| 4,853,764 A | 8/1989 | Sutter |
| 4,890,314 A | 12/1989 | Judd et al. |
| 4,961,211 A | 10/1990 | Tsugane et al. |
| 4,994,912 A | 2/1991 | Lumelsky et al. |
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| D410,447 S | 6/1999 | Chang |
| 5,920,693 A | 7/1999 | Burkman et al. |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A * | 5/2000 | Watanabe ............ 348/316 |
| 6,088,045 A | 7/2000 | Lumelsky et al. |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,082 B1 | 7/2001 | Yonezawa et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,344,874 B1 * | 2/2002 | Helms et al. ............ 348/164 |
| 6,356,589 B1 | 3/2002 | Gebler et al. |
| 6,380,539 B1 * | 4/2002 | Edgar ............ 250/339.05 |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,614,781 B1 | 9/2003 | Elliott et al. |
| 6,680,856 B2 | 1/2004 | Schreiber |
| 6,693,663 B1 | 2/2004 | Harris |
| 6,694,094 B2 * | 2/2004 | Partynski et al. ............ 396/7 |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,801,637 B2 * | 10/2004 | Voronka et al. ............ 382/103 |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,850,266 B1 | 2/2005 | Trinca |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,985,178 B1 | 1/2006 | Morita et al. |
| 6,989,754 B2 | 1/2006 | Kiscanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 * | 7/2006 | Miyano et al. ............ 382/154 |
| 7,072,833 B2 | 7/2006 | Rajan |
| 7,080,157 B2 | 7/2006 | McCanne |
| 7,092,002 B2 | 8/2006 | Ferren et al. |
| 7,095,455 B2 | 8/2006 | Jordan et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |

(56) References Cited

U.S. PATENT DOCUMENTS

| | | |
|---|---|---|
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et al. |
| D542,247 S | 5/2007 | Kinoshita et al. |
| 7,221,260 B2 | 5/2007 | Berezowski et al. |
| D545,314 S | 6/2007 | Kim |
| 7,239,338 B2 | 7/2007 | Krisbergh et al. |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| D559,265 S | 1/2008 | Armstrong et al. |
| D560,681 S | 1/2008 | Fletcher |
| D561,130 S | 2/2008 | Won et al. |
| 7,336,299 B2 | 2/2008 | Kostrzewski |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| D592,621 S | 5/2009 | Han |
| 7,529,425 B2 * | 5/2009 | Kitamura et al. ............. 382/275 |
| 7,532,230 B2 | 5/2009 | Culbertson et al. |
| 7,532,232 B2 | 5/2009 | Shah et al. |
| 7,534,056 B2 * | 5/2009 | Cross et al. .................. 396/427 |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,607,101 B1 | 10/2009 | Barrus |
| 7,616,226 B2 | 11/2009 | Roessler et al. |
| 7,623,115 B2 | 11/2009 | Marks |
| 7,624,417 B2 | 11/2009 | Dua |
| 7,646,419 B2 * | 1/2010 | Cernasov ...................... 348/344 |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| 7,738,457 B2 | 6/2010 | Nordmark et al. |
| D626,102 S | 10/2010 | Buzzard et al. |
| D626,103 S | 10/2010 | Buzzard et al. |
| 7,813,724 B2 | 10/2010 | Gronner et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,886,048 B1 | 2/2011 | Holland et al. |
| 7,889,851 B2 | 2/2011 | Shah et al. |
| 7,894,531 B1 | 2/2011 | Cetin et al. |
| 7,899,265 B1 | 3/2011 | Rostami |
| D635,569 S | 4/2011 | Park |
| D635,975 S | 4/2011 | Seo et al. |
| 7,920,158 B1 | 4/2011 | Beck et al. |
| 7,939,959 B2 | 5/2011 | Wagoner |
| 7,990,422 B2 | 8/2011 | Ahiska et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,130,256 B2 | 3/2012 | Trachtenberg et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| D669,086 S | 10/2012 | Boyer et al. |
| D669,088 S | 10/2012 | Boyer et al. |
| 8,294,747 B1 | 10/2012 | Weinberg et al. |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 8,614,735 B2 | 12/2013 | Buckler |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2003/0220971 A1 | 11/2003 | Kressin |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |

(56) References Cited

U.S. PATENT DOCUMENTS

| | | |
|---|---|---|
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0126894 A1 | 6/2006 | Mori |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1* | 12/2006 | Johnson et al. .......... 250/370.08 |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |
| 2007/0183661 A1 | 8/2007 | El-Maleh et al. |
| 2007/0188597 A1 | 8/2007 | Kenoyer et al. |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0211716 A1 | 9/2007 | Oz et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0068446 A1 | 3/2008 | Barkley et al. |
| 2008/0069444 A1 | 3/2008 | Wilensky |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0003723 A1 | 1/2009 | Kokemohr |
| 2009/0009593 A1 | 1/2009 | Cameron et al. |
| 2009/0051756 A1 | 2/2009 | Trachtenberg |
| 2009/0079812 A1 | 3/2009 | Crenshaw et al. |
| 2009/0096573 A1 | 4/2009 | Graessley |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0147070 A1 | 6/2009 | Marathe et al. |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0324008 A1 | 12/2009 | Kongqiao et al. |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0079355 A1 | 4/2010 | Kilpatrick et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0158387 A1 | 6/2010 | Choi et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1* | 8/2010 | Zhang et al. ................. 348/164 |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0316232 A1 | 12/2010 | Acero et al. |
| 2010/0329511 A1 | 12/2010 | Yoon et al. |
| 2011/0008017 A1 | 1/2011 | Gausereide |
| 2011/0032368 A1 | 2/2011 | Pelling |
| 2011/0039506 A1 | 2/2011 | Lindahl et al. |
| 2011/0063440 A1 | 3/2011 | Neustaedter et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0193982 A1 | 8/2011 | Kook et al. |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |

FOREIGN PATENT DOCUMENTS

| | | |
|---|---|---|
| CN | 102067593 | 5/2011 |
| EP | 502600 A2 * | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |

(56) References Cited

FOREIGN PATENT DOCUMENTS

| | | |
|---|---|---|
| EP | 2255531 | 12/2010 |
| EP | 22777308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2005/031001 A3 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

Electrophysics Glossary, "Infrared Cameras, Thermal Imaging, Night Vision, Roof Moisture Detection," printed Mar. 18, 2010, 11 pages; http://www.electrophysics.com/Browse/Brw_Glossary.asp.

"Super Home Inspectors or Super Inspectors," printed Mar. 18, 2010, 3 pages; http://www.umrt.com/PageManager/Default.aspx/PageID=2120325.

ECmag.com, "IBS Products," Published Apr. 2009, 2 pages; http://www.ecmag.com/index.cfm?fa=article&articleID=10065.

OptoIQ, "Anti-Speckle Techniques Uses Dynamic Optics," Jun. 1, 2009, 2 pages; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html.

OptoIQ, "Vision Systems Design—Machine Vision and Image Processing Technology," printed Mar. 18, 2010, 2 pages; http://www.optoiq.com/index/machine-vision-imaging-processing.html.

OptoIQ, "Smart Camera Supports Multiple Interfaces," Jan. 22, 2009, 2 pages; http://www.optoiq.com/index/machine-vision-imaging-processing/display/vsd-article-display/350639/articles/vision-systems-design/daily-product-2/2009/01/smart-camera-supports-multiple-interfaces.html.

Josh Klint, "Deferred Rendering in Leadwerks Engine," Copyright Leadwersk Corporation 2008, 10 pages; http://www.leadwerks.com/files/Deferred_Rendering_in_Leadwerks_Engine.pdf.

"3D Particles Experiments in AS3 and Flash CS3," printed Mar. 18, 2010, 2 pages; http://www.flashandmath.com/advanced/fourparticles/notes.html.

Arrington, Michael, "eJamming—Distributed Jamming," TechCrunch; Mar. 16, 2006: http://www.techcrunch.com/2006/03/16/ejamming-distributed-jamming/; 1 page.

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.

Chan et al., "Experiments on Block-Matching Techniques for Video Coding," Multimedia Systems, vol. 2, 1994, pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.

"Cisco Expo Germany 2009 Opening," Posted on YouTube on May 4, 2009; http://www.youtube.com/watch?v=SDKsaSlz4MK; 2 pages.

eJamming Audio, Learn More; [retrieved and printed on May 27, 2010] http://www.ejamming.com/learnmore/; 4 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

"France Telecom's Magic Telepresence Wall," Jul. 11, 2006; http://www.humanproductivitylab.com/archive_blogs/2006/07/11/france_telecoms_magic_telepres_1.php; 4 pages.

Guili, D., et al., "Orchestral: A Distributed Platform for Virtual Musical Groups and Music Distance Learning over the Internet in JavaTM Technology"; [retrieved and printed on Jun. 6, 2010] http://ieeexplore.ieee.org/stamp/stamp.jsp?lp=&arnumber=778626; 2 pages.

He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kim, Y.H., et al., "Adaptive mode decision for H.264 encoder," Electronics letters, vol. 40, Issue 19, pp. 1172-1173, Sep. 2004; 2 pages.

Lee, J. and Jeon, B., "Fast Mode Decision for H.264," ISO/IEC MPG and ITU-T VCEG Joint Video Team, Doc. JVT-J033, Dec. 2003; http://media.skku.ac.kr/publications/paper/IntC/ljy_ICME2004.pdf; 4 pages.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

(56) References Cited

OTHER PUBLICATIONS

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.
Shum, H.-Y, et al., "A Review of Image-Based Rendering Techniques," in SPIE Proceedings vol. 4067(3): Proceedings of the Conference on Visual Communications and Image Processing 2000, Jun. 20-23, 2000, Perth, Australia; pp. 2-13; https://research.microsoft.com/pubs/68826/review_image_rendering.pdf.
Sonoma Wireworks Forums, "Jammin on Rifflink," [retrieved and printed on May 27, 2010] http://www.sonomawireworks.com/forums/viewtopic.php?id=2659; 5 pages.
Sonoma Wireworks Rifflink, [retrieved and printed on Jun. 2, 2010] http://www.sonomowireworks.com/rifflink.php; 3 pages.
Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.
Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.
Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.
Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.
Xin, Jun, et al., "Efficient macroblock coding-mode decision for H.264/AVC video coding," Technical Report MERL 2004-079, Mitsubishi Electric Research Laboratories, Jan. 2004; www.merl.com/publications/TR2004-079/; 12 pages.
Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
PCT Aug. 24, 2010 PCT International Search Report mailed Aug. 24, 2010 for PCT/US2010033880; 4 pages.
PCT Aug. 26, 2010 International Preliminary Report on Patentability mailed Aug. 26, 2010 for PCT/US2009/001070; 10 pages.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
Yegani, P. et al., "GRE Key Extension for Mobile IPv4," Network Working Group, Feb. 2006, 11 pages; http://tools.ietf.org/pdf/draft-yegani-gre-key-extension-01.pdf.
U.S. Appl. No. 12/234,291, filed Sep. 19, 2008, entitled "System and Method for Enabling Communication Sessions in a Network Environment," Inventor(s): Yifan Gao et al.
U.S. Appl. No. 12/366,593, filed Feb. 5, 2009, entitled "System and Method for Depth Perspective Image Rendering," Inventor(s): J. William Mauchly et al.
U.S. Appl. No. 12/475,075, filed May 29, 2009, entitled "System and Method for Extending Communications Between Participants in a Conferencing Environment," Inventor(s): Brian J. Baldino et al.
U.S. Appl. No. 12/400,540, filed Mar. 9, 2009, entitled "System and Method for Providing Three Dimensional Video Conferencing in a Network Environment," Inventor(s): Karthik Dakshinamoorthy et al.
U.S. Appl. No. 12/400,582, filed Mar. 9, 2009, entitled "System and Method for Providing Three Dimensional Imaging in a Network Environment," Inventor(s): Shmuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, filed May 11, 2009, entitled "System and Method for Translating Communications Between Participants in a Conferencing Environment," Inventor(s): Marthinus F. De Beer et al.
U.S. Appl. No. 12/784,257, filed May 20, 2010, entitled "Implementing Selective Image Enhancement," Inventors: Dihong Tian et al.
Active8-3D—Holographic Projection—3D Hologram Retail Display & Video Project, [retrieved Feb. 24, 2009], http://www.activ8-3d.co.uk/3d_holocubes, 1 page.
Avrithis, Y., et al., "Color-Based Retrieval of Facial Images," European Signal Processing Conference (EUSIPCO '00), Tampere, Finland; Sep. 2000; 18 pgs.
Bakstein, Hynek, et al., "Visual Fidelity of Image Based Rendering," Center for Machine Perception, Czech Technical University, 10 pages.
Boccaccio, Jeff; CEPro, "Inside HDMI CEC: The Little-Known Control Feature," http://www.cepro.com/article/print/inside_hdmi_cec_the_little_known_control_feature; Dec. 28, 2007, 2 pages.
Chen, Jason, "iBluetooth Lets iPhone Users Send and Receive Files Over Bluetooth," Mar. 13, 2009; 1 page; http://i.gizmodo.com/5169545/ibluetooth-lets-iphone-users-send-and-receive-files-over-bluetooth.
Cisco: Bill Mauchly and Mod Marathe; UNC: Henry Fuchs, et al., "Depth-Dependent Perspective Rendering," 6 pgs.
Costa, Cristina, et al., "Quality Evaluation and Nonuniform Compression of Geometrically Distorted Images Using the Quadtree Distorion Map," EURASIP Journal on Applied Signal Processing, vol. 2004, No. 12; pp. 1899-1911; © 2004 Hindawi Publishing Corp.; XP002536356; ISSN: 1110-8657; 16 pages.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved Feb. 26, 2009], http://research.microsoft.com/pubs/67266/criminis_techrep2003-59.pdf, 41 pages.
Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; pp. 443-447, ISBN: 978-0-8186-8821-8; XP010586786, 5 pages.
Diaz, Jesus, iPhone Bluetooth File Transfer Coming Soon (YES!); Jan. 25, 2009; 1 page; http://i.gizmodo.com/5138797/iphone-bluetooth-file-transfer-coming-soon-yes.
Diaz, Jesus, "Zcam 3D Camera is Like Wii Without Wiimote and Minority Report Without Gloves," Dec. 15, 2007, 3 pgs.; http://gizmodo.com/gadgets/zcam-depth-camera-could-be-wii-challenger/zcam-3d-camera-is-like-wii-without-wiimote-and-minority-report-without-gloves-334426.php.
DVE Digital Video Enterprises, "DVE Tele-Immersion Room," http://www.dvetelepresence.com/products/immersion_room.asp; 2009, 2 pgs.
"Dynamic Displays," copyright 2005-2008 [retrieved Feb. 24, 2009], http://www.zebraimaging.com/html/lighting_display.html, 2 pages.

(56) References Cited

OTHER PUBLICATIONS

ECmag.com, "IBS Products," Published Apr. 2009, 2 pages; http://www.ecmag.com/index.cfm?fa=articleID=10065.
Farrukh, A., et al., Automated Segmentation of Skin-Tone Regions in Video Sequences, Proceedings IEEE Students Conference, ISCON_apos_02; Aug. 16-17, 2002; pp. 122-128; 7pgs.
Fiala, Mark, "Automatic Projector Calibration Using Self-Identifying Patterns," National Research Council of Canada, 2005; http://www.procams.org/procams2005/papers/procams05-36.pdf; 6 pages.
Freeman, Professor Wilson T., Computer Vision Lecture Slides, "6.869 Advances in Computer Vision: Learning and Interfaces," Spring 2005; 21 pages.
Gemmell, Jim, et al., "Gaze Awareness for Video-conferencing: A Software Approach," IEEE MultiMedia, Oct.-Dec. 2000; 10 pages.
Gotchev, Atanas, "Computer Technologies for 3D Video Delivery for Home Entertainment," International Conference on Computer Systems and Technologies; CompSysTech '08; 6 pgs; http://ecet.ecs.ru.acad.bg/cst08/docs/cp/Plenary/P.1.pdf.
Gries, Dan, "3D Particles Experiments in AS3 and Flash CS3, Dan's Comments," printed May 24, 2010 http://www.flashandmath.com/advanced/fourparticles/notes.html; 3pgs.
Guernsey, Lisa, "Toward Better Communication Across the Language Barrier," Jul. 29, 1999, http://www.nytimes.com/1999/07/29/technology/toward-better-communication-across-the-language-barrier.html; 2 pages.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; pp. 1086-1097; XP011115755; 13 pages.
Holographic Imaging, "Dynamic Holography for scientific uses, military heads up display and even someday HoloTV Using TI's DMD," [retrieved Feb. 26, 2009], http://innovation.swmed.edu/research/instrumentation/res_inst_dev3d.html, 5 pages.
Hornbeck, Larry J., "Digital Light Processing™: A New MEMS-Based Display Technology," [retrieved Feb. 26, 2009]; http://focus.ti.com/pdfs/dlpdmd/17_Digital_Light_Processing_MEMS_display_technology.pdf, 22 pages.
"Infrared Cameras TVS-200-EX," printed May 24, 2010; 2 pgs.; http://www.electrophysics.com/Browse/Brw_ProductLineCategory.asp?CategoryID=184&Area=IS.
IR Distribution Category @ Envious Technology, "IR Distribution Category," 2 pages http://www.envioustechnology.com.au/products/product-list.php?CID=305, printed on Apr. 22, 2009.
IR Trans—Products and Orders—Ethernet Devices, 2 pages http://www.irtrans.de/en/shop/lan.php, printed on Apr. 22, 2009.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303; 16 pages.
Itoh, Hiroyasu, et al., "Use of a gain modulating framing camera for time-resolved imaging of cellular phenomena," SPIE vol. 2979, 1997, pp. 733-740; 8 pages.
Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; 8 pages.
Kazutake, Uehira, "Simulation of 3D image depth perception in a 3D display using two stereoscopic displays at different depths," http://adsabs.harvard.edu/abs/2006SPIE.6055.408U; 2006, 2 pgs.
Keijser, Jeroen, et al., "Exploring 3D Interaction in Alternate Control-Display Space Mappings," IEEE Symposium on 3D User Interfaces, Mar. 10-11, 2007, pp. 17-24; 8 pages.
Klint, Josh, "Deferred Rendering in Leadwerks Engine," Copyright Leadwersk Corporation 2008, 10 pages; http://www.leadwerks.com/files/Deferred_Rendering_in_Leadwerks_Engine.pdf.
Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; 6 pages http://ieeexplore.ieee.org/stamp/stamp.jsp?tp=&arnumber=4455782&isnumber=4455723.
Lawson, S., "Cisco Plans TelePresence Translation Next Year," Dec. 9, 2008; http://www.pcworld.com/article/155237/.html?tk=rss_news; 2 pages.
Miller, Gregor, et al., "Interactive Free-Viewpoint Video," Centre for Vision, Speech and Signal Processing, [retrieved Feb. 26, 2009], http://www.ee.surrey.ac.uk/CVSSP/VMRG/ Publications/miller05cvmp.pdf, 10 pages.
"Minoru from Novo is the worlds first consumer 3D Webcam," Dec. 11, 2008 [retrieved Feb. 24, 2009], http://www.minoru3d.com, 4 pages.
Mitsubishi Electric Research Laboratories, copyright 2009 [Retrieved Feb. 26, 2009], http://www.merl.com/projects/3dtv, 2 pages.
National Training Systems Association Home—Main, Interservice/Industry Training, Simulation & Education Conference, Dec. 1-4, 2008 [retrieved Feb. 26, 2009], http://ntsa.metapress.com/app/home/main.asp?referrer=default, 1 page.
OptoIQ, "Vision + Automation Products—VideometerLab 2," 11 pgs.; http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml.
PCT "Notification of Transmittal of the International Search Report and the Written Opinion of the International Searching Authority, or the Declaration," PCT/US2009/001070, dated Apr. 8, 2009; 17 pages.
PCT Notification of Transmittal of the International Search Report and the Written Opinion of the International Searching Authority, or the Declaration; PCT/US2009/038310; dated Oct. 10, 2009; 19 pages.
"Rayvel Business-to-Business Products," copyright 2004 [retrieved Feb. 24, 2009], http://www.rayvel.com/b2b.html, 2 pages.
School of Computing, "Bluetooth over IP for Mobile Phones," 1 page http://www.computing.dcu.ie/wwwadmin/fyp-abstract/list/fyp_details05.jsp?year=2005&number=51470574.
SENA, "Industrial Bluetooth," 1 page http://www.sena.com/products/industrial_bluetooth, printed on Apr. 22, 2009.
Shaffer, Shmuel, "Translation—State of the Art" presentation; Jan. 15, 2009; 22 pages.
Shi, C. et al., "Automatic Image Quality Improvement for Videoconferencing," IEEE ICASSP © 2004, 4 pgs.
Smarthome, "IR Extender Expands Your IR Capabilities," 3 pages http://www.smarthome.com/8121.html, printed Apr. 22, 2009.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE-Int. Soc. Opt. Eng USA ISSN: 0277-786X; pp. 78-88; XP007905596; 11pgs.
Total immersion, Video Gallery, copyright 2008-2009 [retrieved Feb. 26, 2009], http://www.t-immersion.com/en,video-gallery,36.html, 1 page.
Trucco, E., et al., "Real-Time Disparity Maps for Immersive 3-D Teleconferencing by Hybrid Recursive Matching and Census Transform," 9 pages; retrieved and printed from the website on May 4, 2010 from http://server.cs.ucf.edu/~vision/papers.VidReg-final.pdf.
Tsapatsoulis, N., et al., "Face Detection for Multimedia Applications," Proceedings of the ICIP '00; Vancouver, BC, Canada; Sep. 2000; 4 pages.
Tsapatsoulis, N., et al., "Face Detection in Color Images and Video Sequences," $10^{th}$ Mediterranean Electrotechnical Conference (MELECON), 2000; vol. 2; 21 pgs.
Wang, Hualu, et al., "A Highly Efficient System for Automatic Face Region Detection in MPEG Video," IEEE Transactions on Circuits and Systems for Video Technology; 26 pgs; vol. 7, Issue 4; 1977 pp. 615-628.

(56) References Cited

OTHER PUBLICATIONS

Wilson, Mark, "Dreamoc 3D Display Turns Any Phone Into Hologram Machine," Oct. 30, 2008 [retrieved Feb. 24, 2009], http://gizmodo.com/5070906/dreamoc-3d-display-turns-any-phone-into-hologram-machine, 2 pages.
WirelessDevNet, Melody Launches Bluetooth Over IP, http://www.wirelessdevnet.com/news/2001/ 155/news5.html; 2 pages, printed on Jun. 5, 2001.
WO 2008/118887 A3 Publication with PCT International Search Report (4 pages), International Preliminary Report on Patentability (1 page), and Written Opinion of the ISA (7 pages); PCT/US2008/058079; dated Sep. 18, 2008.
Yang, Jie, et al., "A Real-Time Face Tracker," Proceedings $3^{rd}$ IEEE Workshop on Applications of Computer Vision; 1996; Dec. 2-4, 1996; pp. 142-147; 6 pgs.
Yang, Ming-Hsuan, et al., "Detecting Faces in Images: A Survey," vol. 24, No. 1; Jan. 2002; pp. 34-58: 25 pgs.
Yang, Ruigang, et al., "Real-Time Consensus-Based Scene Reconstruction using Commodity Graphics Hardware," Department of Computer Science, University of North Carolina at Chapel Hill, 10 pgs.
Yoo, Byounghun, et al., "Image-Based Modeling of Urban Buildings Using Aerial Photographs and Digital Maps," Transactions in GIS, vol. 10 No. 3, p. 377-394, 2006; 18 pages [retrieved May 17, 2010], http://icad,kaist.ac.kr/publication/paper_data/image_based.pdf.
U.S. Appl. No. 13/096,772, filed Apr. 28, 2011, entitled "System and Method for Providing Enhanced Eye Gaze in a Video Conferencing Environment," Inventors(s): Charles C. Byers.
U.S. Appl. No. 13/106,002, filed May 12, 2011, entitled "System and Method for Video Coding in a Dynamic Environment," Inventors: Dihong Tian et al.
U.S. Appl. No. 13/098,430, filed Apr. 30, 2011, entitled "System and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers.
U.S. Appl. No. 13/298,022, filed Nov. 16, 2011, entitled "System and Method for Alerting a Participant in a Video Conference," Inventor(s): TiongHu Lian, et al.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
EPO Communication dated Feb. 25, 2011 for EP09725288.6 (published as EP22777308); 4 pages.
Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
Gemmell, Jim, et al., "Gaze Awareness for Video-conferencing: A Software Approach," IEEE MultiMedia, Oct.-Dec. 2000; vol. 7, No. 4, pp. 26-35.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].
U.S. Appl. No. 12/781,722, filed May 17, 2010, entitled "System and Method for Providing Retracting Optics in a Video Conferencing Environment," Inventor(s): Joseph T. Friel, et al.
U.S. Appl. No. 12/877,833, filed Sep. 8, 2010, entitled "System and Method for Skip Coding During Video Conferencing in a Network Environment," Inventor[s]: Dihong Tian, et al.
U.S. Appl. No. 12/870,687, filed Aug. 27, 2010, entitled "System and Method for Producing a Performance Via Video Conferencing in a Network Environment," Inventor(s): Michael A. Arnao et al.
U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," Inventor(s): J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, entitled "System and Method for Providing Enhanced Video Processing in a Network Environment," Inventor[s]: David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.
U.S. Appl. No. 12/957,116, filed Nov. 30, 2010, entitled "System and Method for Gesture Interface Control," Inventors: Shuan K. Kirby, et al.
U.S. Appl. No. 13/036,925, filed Feb. 28, 2011, entitled "System and Method for Selection of Video Data in a Video Conference Environment," Inventor(s) Sylvia Olayinka Aya Manfa N'guessan.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s):Ashok T. Desai et al.
Design U.S. Appl. No. 29/369,951, filed Sep. 15, 2010, entitled "Video Unit With Integrated Features," Inventor(s): Kyle A. Buzzard et al.
Design U.S. Appl. No. 29/375,458, filed Sep. 22, 2010, entitled "Video Unit With Integrated Features," Inventor(s): Kyle A. Buzzard et al.
Design U.S. Appl. No. 29/375,619, filed Sep. 24, 2010, entitled "Free-Standing Video Unit," Inventor(s): Ashok T. Desai et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis, Jr. et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
"Eye Tracking," from Wikipedia, (printed on Aug. 31, 2011) 12 pages; http://en.wikipedia.org/wiki/Eye_tracker.

(56) References Cited

OTHER PUBLICATIONS

"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.

"Vocative Case," from Wikipedia, [retrieved and printed on Mar. 3, 2011] 11 pages; http://en.wikipedia.org/wiki/Vocative_case.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.

"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

Andersson, L., et al., "LDP Specification," Network Working Group, RFC 3036, Jan. 2001, 133 pages; http://tools.ietf.org/html/rfc3036.

Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.

Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages http://www.cs.ubc.ca/~murphyk/Software/Kalman/ParticleFilterTutorial.pdf.

Awduche, D., et al., "Requirements for Traffic Engineering over MPLS," Network Working Group, RFC 2702, Sep. 1999, 30 pages; http://tools.ietf.org/pdf/rfc2702.pdf.

Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.

Boros, S., "Policy-Based Network Management with SNMP," Proceedings of the EUNICE 2000 Summer School Sep. 13-15, 2000, p. 3.

Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.

Digital Video Enterprises, "DVE Eye Contact Silhouette," 1 page, © DVE 2008; http://www.dvetelepresence.com/products/eyeContactSilhouette.asp.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.

Garg, Ashutosh, et al., "Audio-Visual ISpeaker Detection Using Dynamic Bayesian Networks," IEEE International Conference on Automatic Face and Gesture Recognition, 2000 Proceedings, 7 pages http://www.ifp.illinois.edu/~ashutosh/papers/FG00.pdf.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gluckman, Joshua, et al., "Rectified Catadioptric Stereo Sensors," 8 pages, retrieved and printed on May 17, 2010; http://cis.poly.edu/~gluckman/papers/cvpr00.pdf.

Gundavelli, S., et al., "Proxy Mobile IPv6," Network Working Group, RFC 5213, Aug. 2008, 93 pages; http://tools.ietf.org/pdf/rfc5213.pdf.

3G, "World's First 3G Video Conference Service with New TV Commercial," Apr. 28, 2005, 4 pages; http://www.3g.co.uk/PR/April2005/1383.htm.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

"Wi-Fi Protected Setup," from Wikipedia, Sep. 2, 2010, 3 pages http://en.wikipedia.org/wiki/Wi-Fi_Protected_Setup.

"G-stalt version 1," video clip, YouTube.com, posted by zigg1es on Mar. 15, 2009, 1 page; http://youtube.com/watch?v=k8ZAql4mdvk.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

"Oblong Industries is the developer of the g-speak spatial operation environment," Oblong Industries Information Page, 2 pages, [Retrieved and printed on Dec. 1, 2010] http://oblong.com.

Butler, Darren, et al., "Robust Face Localisation Using Motion, Colour & Fusion" ; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.

Chien et al., "Efficient moving Object Segmentation Algorithm Using Background Registration Technique," IEEE Transactions on Circuits and Systems for Video Technology, vol. 12, No. 7, Jul. 2002, 10 pages.

Dornaika F., et al., "Head and Facial Animation Tracking Using Appearance-Adaptive Models and Particle Filters," Jun. 27, 2004-Jun. 2, 2004, 22 pages; HEUDIASY Research Lab, http://eprints.pascal-network.org/archive/00001231/01/rtvhci_chapter8.pdf.

EPO Aug. 15, 2011 Response to EPO Communication mailed Feb. 25, 2011 from European Patent Application No. 09725288.6; 15 pages.

EPO Jul. 10, 2012 Response to EP Communication from European Application EP10723445.2.

EPO Sep. 24, 2012 Response to Mar. 20, 2012 EP Communication from European Application EP09725288.6.

Feld, Brad, "Science Fact," Oblong Industries, Inc. Web Log, Nov. 13, 2008, 2 pages,http://oblong.com/article/084H-PKI5Tb9I4Ti.html.

Gussenhoven, Carlos, "Chapter 5 Transcription of Dutch Intonation," Nov. 9, 2003, 33 pages; http://www.ru.nl/publish/pages/516003/todisun-ah.pdf.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages; http://www.umiacs.umd.edu/~knkim/paper/itc-cscc-2000-jgko.pdf.

(56) References Cited

OTHER PUBLICATIONS

Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages http://fulfillment.umi.com/dissertations/b7afbcb56ba72fdb14d26dfccc6b470f/1291487062/3143800.pdf.

Kramer, Kwindla, "g-speak + TMG," Oblong Industries, Inc. Web Log, Mar. 24, 2009, 1 page; http://oblong.com/article/08mM77zpYMm7kFtv.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "Mary Ann de Lares Norris at Thinking Digital," Oblong Industries, Inc. Web Log, Aug. 24, 2010; 1 page; http://oblong.com/articles/0BS6hEeJmoHoCwgJ.html.

Kramer, Kwindla, "Oblong at TED," Oblong Industries, Inc. Web Log, Jun. 6, 2010, 1 page; http://oblong.com/article/0B22LFIS1NVyrOmR.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kwindla Kramer, "g-speak in slices," Oblong Industries, Inc. Web Log, Nov. 13, 2008, 6 pages; http://oblong.com/article/0866JqfNrFg1NeuK.html.

Lambert, "Polycom Video Communications," © 2004 Polycom, Inc., Jun. 20, 2004 http://www.polycom.com/global/documents/whitepapers/video_communications_h.239_people_content_polycom_patented_technology.pdf.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrl.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.

PCT Sep. 25, 2007 Notification of Transmittal of the International Search Report from PCT/US06/045895.

PCT Sep. 2, 2008 International Preliminary Report on Patentability (1 page) and the Written Opinion of the ISA (4 pages) from PCT/US2006/045895.

PCT Sep. 11, 2008 Notification of Transmittal of the International Search Report from PCT/US07/009469.

PCT Nov. 4, 2008 International Preliminary Report on Patentability (1 page) and the Written Opinion of the ISA (8 pages) from PCT/US2007/009469.

PCT May 11, 2010 International Search Report from PCT/US2010/024059; 4 pages.

PCT Oct. 7, 2010 PCT International Preliminary Report on Patentability mailed Oct. 7, 2010 for PCT/US2009/038310; 10 pages.

PCT Feb. 23, 2010 PCT Notification of Transmittal of the International Search Report and the Written Opinion of the International Searching Authority, or the Declaration for PCT/US2009/064061 mailed Feb. 23, 2010; 14 pages.

PCT Jun. 29, 2010 PCT "International Search Report and the Written Opinion of the International Searching Authority, or the Declaration," PCT/US2010/026456, dated Jun. 29, 2010, 11 pages.

PCT Oct. 12, 2011 International Search Report and Written Opinion of the ISA from PCT/US2011/050380.

PCT Nov. 24, 2011 International Preliminary Report on Patentability from International Application Serial No. PCT/US2010/033880; 6 pages.

PCT Aug. 23, 2011 International Preliminary Report on Patentability and Written Opinion of the ISA from PCT/US2010/024059; 6 pages.

PCT Sep. 13, 2011 International Preliminary Report on Patentability and the Written Opinion of the ISA from PCT/US2010/026456; 5 pages.

Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.

Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.

PRC Dec. 18, 2012 Response to SIPO First Office Action from Chinese Application No. 200980119121.5; 16 pages.

PRC Aug. 3, 2012 SIPO First Office Action from Chinese Application No. 200980119121.5; 16 pages.

PRC Jan. 7, 2013 SIPO Second Office Action from Chinese Application Serial No. 200980105262.1.

Radhika, N., et al., "Mobile Dynamic reconfigurable Context aware middleware for Adhoc smart spaces," Academic Open Internet Journal, ISSN 1311-4360, vol. 22, 2008; 3 pages http://www.acadjournal.com/2008/V22/part6/p7.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

Rikert, T.D., et al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.

Rishel, Christian, "Commercial overview: Platform and Products," Oblong Industries, Inc., Nov. 13, 2008, 3 pages; http://oblong.com/article/086E19gPvDcktAf9.html.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.

Tan, Kar-Han, et al., "Appearance-Based Eye Gaze Estimation," In Proceedings IEEE WACV'02, 2002, 5 pages; http://citeseer.ist.psu.edu/viewdoc/summary?doi=10.1.1.19.8921.

Trevor Darrell, "A Real-Time Virtual Mirror Display," 1 page, Sep. 9, 1998; http://people.csail.mit.edu/trevor/papers/1998-021/node6.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Carlton Sparrell speaks at MIT," Oblong Industries, Inc. Web Log, Oct. 30, 2009, 1 page; http://oblong.com/article/09usAB4I1Ukb6CPw.html.

(56) References Cited

OTHER PUBLICATIONS

Underkoffler, John, "G-Speak Overview 1828121108," video clip, Vimeo.com, 1 page, [Retrieved and printed on Dec. 1, 2010] http://vimeo.com/2229299.
Underkoffler, John, "Oblong at Altitude: Sundance 2009," Oblong Industries, Inc. Web Log, Jan. 20, 2009, 1 page; http://oblong.com/article/08Sr62ron_2akg0D.html.
Underkoffler, John, "Oblong's tamper system 1801011309," video clip, Vimeo.com, 1 page, [Retrieved and printed Dec. 1, 2010] http://vimeo.com/2821182.
Underkoffler, John, "Origins: arriving here," Oblong Industries, Inc. Web Log, Nov. 13, 2008, 5 pages; http://oblong.com/article/085zBpRSY9JeLv2z.html.
Veratech Corp., "Phantom Sentinel," © VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.
Wachs, J., et al., "A Real-time Hand Gesture System Based on Evolutionary Search," Vision, 3$^{rd}$ Quarter 2006, vol. 22, No. 3, 18 pages; http://web.ics.purdue.edu/~jpwachs/papers/3q06vi.pdf.
Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.
Wang, Robert and Jovan Popovic, "Desktop virtual reality," video clip, YouTube, posted by rkeltset on Apr. 8, 2010, 1 page; http://www.youtube.com/watch?v=9rBtm62Lkfk.
Wang, Robert and Jovan Popovic, "Gestural user input," video clip, YouTube, posted by rkeltset on May 19, 2010, 1 page; http://www.youtube.com/watch?v=3JWYTtBjdTE.
Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.
Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.
Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.
Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.
Weinstein et al., "Emerging Technologies for Teleconferencing and Telepresence," Wainhouse Research 2005; http://www.ivci.com/pdf/whitepaper-emerging-technologies-for-teleconferencing-and-telepresence.pdf.
Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.
Zhong, Ren, et al., "Integration of Mobile IP and MPLS," Network Working Group, Jul. 2000, 15 pages; http://tools.ietf.org/html/draft-zhong-mobile-ip-mpls-01.
U.S. Appl. No. 14/055,427, filed Oct. 16, 2013, entitled "System and Method for Provisioning Flows in a Mobile Network Environment," Inventors: Balaji Vankat Vankataswami, et al.
PRC Aug. 28, 2013 SIPO First Office Action from Chinese Application No. 201080010988.X 7 pages.
PRC Nov. 26, 2013 SIPO First Office Action from Chinese Application No. 201080020670 5pgs.
PCT Mar. 21, 2013 International Preliminary Report on Patentability from International Application Serial No. PCT/US2011/050380.
PCT May 30, 2013 International Preliminary Report on Patentability and Written Opinion from the International Searching Authority for International Application Serial No. PCT/US2011/061442 8 pages.
PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
PRC Apr. 3, 2013 SIPO Second Office Action from Chinese Application No. 200980119121.5; 16 pages.
PRC Jun. 18, 2013 Response to SIPO Second Office Action from Chinese Application No. 200980119121.5; 5 pages.
PRC Jul. 9, 2013 SIPO Third Office Action from Chinese Application No. 200980119121.5; 15 pages.
PRC Sep. 24, 2013 Response to SIPO Third Office Action from Chinese Application No. 200980119121.5; 5 pages.
U.S. Appl. No. 14/154,608, filed Jan. 14, 2014, entitled "System and Method for Extending Communications Between Participants in a Conferencing Environment," Inventors: Brian Baldino, et al.
PRC May 5, 2014 SIPO Second Office Action from Chinese Application No. 201080010988.x (English Translation Only).
PRC Nov. 15, 2014 SIPO Third Office Action from Chinese Application No. 201080010988.x.
PRC Sep. 3, 2014 SIPO First Office Action from Chinese Application No. 201180054805.

\* cited by examiner

SYSTEM AND METHOD FOR ENHANCING VIDEO IMAGES IN A CONFERENCING ENVIRONMENT

TECHNICAL FIELD

This disclosure relates in general to the field of video imaging and, more particularly, to enhancing video images in a conferencing environment.

BACKGROUND

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. Some issues have arisen in video conferencing scenarios where proper lighting is not provided during a video conference. Deficient lighting can hinder the quality of video images being sent to participants in a video conference. The ability to optimize lighting environments provides a significant challenge to system designers, device manufacturers, and participants of video conferences.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving image data for a field of view associated with a display. The image data is used to generate a plurality of red green blue (RGB) frames. The method also includes emitting infrared energy onto the field of view in order to generate a plurality of infrared frames, the plurality of RGB frames and the plurality of infrared frames are generated by a single camera. The plurality of RGB frames can be combined with the plurality of infrared frames in order to generate a video data stream.

In a more particular embodiment, the emitting of the infrared energy is synchronized with the camera such that the infrared energy is emitted onto the field of view at one half of an existing frame rate of the camera. An infrared phase associated with emitting the infrared energy can have a shorter exposure time than a RGB phase associated with generating the RGB frames such that the camera has unequal shutter times. Every other video frame generated by the camera is an infrared frame for which the infrared energy was provided. The method can also include executing image denoising to reduce temporal noise or spatial noise associated with the plurality of RGB frames. Further, the method can include adding infrared video image data on a pixel basis to generate enhanced video frames included in the video data stream.

Example Embodiments

Figure 1:
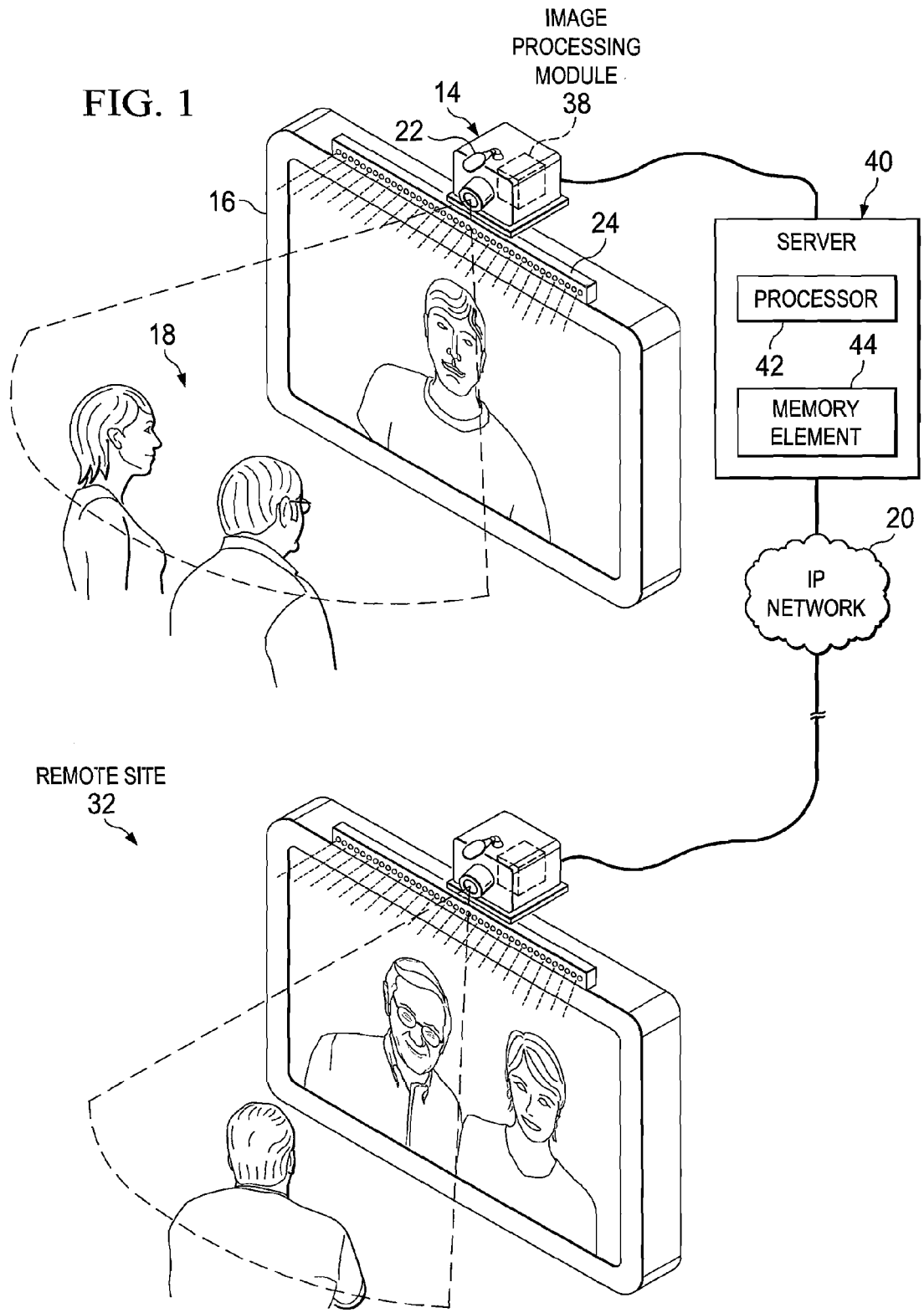
FIG. 1 is a simplified block diagram of a system for enhancing video images in a conferencing environment in accordance with one embodiment of the present disclosure.

Turning to FIG. 1, FIG. 1 is a simplified block diagram of a system 10 for providing enhanced video images in a conferencing environment. System 10 may include a camera 14, a display 16, one or more audience members 18, an Internet protocol (IP) network 20, and a server 40. A remote site 32 is also provided in FIG. 1, where audience members 18 can interface with individuals at remote site 32 during a video conference. Camera 14 may include an image processing module 38 and a microphone 22 in a particular implementation. A series of illumination elements 24 are also provided in conjunction with camera 14, where illumination elements 24 can be configured to shine infrared (IR) light on audience members 18, as described below. Server 40 may include a processor 42 and a memory element 44. In general terms, system 10 can be configured to capture video image data under low visible light, but also under bright infrared light, by intermittently flashing infrared light at a particular frame rate. A process can then be employed to combine the multi-spectral images to create a low-noise red-green-blue (RGB) video output having enhanced picture quality.

For purposes of illustrating certain example techniques of system 10, it is important to understand the communications that may be occurring in a video conferencing environment. The following foundational information may be viewed as a basis from which the present disclosure may be properly explained. In modern digital imaging, lighting is an inherent problem. Many video conferencing systems can attain terrific image quality under controlled environments. For example, some component manufacturers can build a complete room that provides exceptional lighting for video conferencing activities. However, in environments where the lighting conditions are poor (e.g., in homes, in small offices, in Internet cafés, etc.), the image quality can deteriorate significantly (e.g., due to incorrect exposure, low contrast problems, high noise characteristics, a lack of sharp details, etc.).

Note that low-light performance can be rectified by simply providing more (or more intense) visible light energy. However, most individuals in video conferencing scenarios would rather not be subjected to harsh lighting environments, nor would these individuals wish to incur excessive fees in adding new lighting fixtures, just to assist in generating acceptable video images. Infrared illumination can enhance video images, but using pure infrared illumination would not offer acceptable color characteristics in video imaging applications. For example, night vision systems can capture details associated with a scene, but these monochromatic systems do not provide acceptable color images. Simply using two cameras (e.g., one camera for RGB images and another camera for infrared images) is not ideal because using two cameras implicates two different lenses and two different viewpoints, which ultimately need to be integrated.

System 10 can resolve the aforementioned issues (and others) to combine the properties of infrared illumination with the color properties of RGB frames to offer an optimal solution in video conferencing scenarios. System 10 is configured to use infrared illumination, which is invisible to humans, and a fusion process to combine an infrared image with an RGB image. In a general sense, while a low-light RGB image may appear grainy (or include unwanted noise), it can be improved with information from the infrared image, which may include a much better signal-to-noise ratio (SNR). Additionally, system 10 can be configured to use a single camera for the collection of red, green, blue, and infrared light. Hence, system 10 (even though operating in a low-light environment) can achieve better image quality using a single camera configuration that includes strobing infrared light.

In one particular example, infrared illumination can be synchronized to camera 14 and flashed onto a scene (e.g., audience members 18) at one-half of the existing frame rate. This protocol can cause every other video frame to be an infrared image, where the other video frames would represent simple RGB images. Video signal processing of the image sequence can fuse the RGB and infrared frames to create a superior final video stream having natural color, low picture noise, and sharper edges. Additionally, signal-to-noise ratio parameters can be further improved by using a shorter exposure for the infrared phase and a longer exposure for the RGB phase. This creates unequal shutter times for camera 14, which enhances the video images. System 10 can also include the use of multiple bilateral filters, as detailed below with respect to FIG. 3.

System 10 can be configured to combine a full-spectral image sensor with a near-infrared (NIR) illuminator (e.g., illumination elements 24), which can be synchronized to a capturing clock. Illumination elements 24 can be only activated at half of the frame rate and for a sufficiently small amount of time (to avoid partial exposure due to the rolling shutter). Additionally, system 10 can be configured to capture temporally adjacent image pairs, including ones with and without exposure to the infrared flash. System 10 can include an infrared-sensitive sensor that is collocated with the color (i.e., RGB) imaging sensor for sharing the incoming light with an optical beam splitter. The two sensors can be synchronized (e.g., gen-locked) to capture videos at the same frame rate. Pixel correspondences between the two sensors can also be calibrated. The RGB sensor may have a different resolution than the infrared sensor, in which case re-sampling can occur during the calibration stage.

Input to image processing module 38 can include a pair of IR/RGB images at every frame, with the captured infrared video providing a bright and clear view of the environment, while the color image can contain desired perceptual characteristics (albeit with low intensity and high noise). The image-processing pipeline can include three phases following a pre-processing step that stretches a dark color image to the full dynamic range. The phases can include image denoising, detail transfer, and perceptual quality improvement. The first two phases can be focused on fusing the infrared video data into the color domain. The third phase can be used to adjust the brightness and the color tone of the image in a face-centric fashion, as discussed in detail below.

In regards to a physical infrastructure, camera 14 can be configured to fasten to any edge (e.g., a top edge) of a flat screen (e.g., display 16). Camera 14 can be included as part of an integrated component (i.e., a single component, a proprietary element, a set-top box, etc.) that could include microphone 22 (e.g., an array microphone) and infrared illumination elements 24. Thus, all of these elements (camera 14, microphone 22, infrared illumination elements 24, etc.) can be combined and/or be suitably consolidated into an integrated component that rests on (or is fixed to, or is positioned near) display 16. Alternatively, each of these elements (camera 14, microphone 22, infrared illumination elements 24, etc.) are their own separate devices that can be coupled (or simply interact with each other), or be adequately positioned in any appropriate fashion.

In one example implementation, the illuminators of illumination elements 24 include a bank of small infrared light emitting diodes (LEDs) positioned linearly (e.g., in a line about 15 inches long). The LEDs can be covered with a plastic diffuser, where the circuit that drives the LEDs can be synchronized to the frame rate of camera 14. The LEDs can readily be pulsed on and off in microsecond intervals, or triggered using any other suitable timing configuration. Camera 14 does not use an infrared filter in certain implementations. In other example scenarios, illumination elements 24 can have a single LED (or simply a few, possibly larger LEDs) that can provide an appropriate level of light energy for improving video image data. Along similar reasoning, the LEDs can readily be replaced by other lighting mechanisms that could provide the appropriate amount of infrared energy. Additionally, it should be noted that, in alternative embodiments, illumination elements 24 can emit other types of light that could be used in enhancing video image data. For example, illumination elements 24 (instead of using infrared energy) could use/flash other types of light energy that could augment or otherwise improve video image data.

In one example implementation, camera 14 includes a complementary metal-oxide-semiconductor (CMOS) sensor with a Bayer pattern. A hot mirror can also be included in this configuration, where the hot mirror represents a specialized dielectric mirror/dichroic filter configured to reflect infrared light back into a light source, while allowing visible light to pass. The hot mirror that deflects infrared light can have two positions. In a daylight mode, the hot mirror can be positioned over the lens of camera 14, where no infrared light reaches camera 14. In a nighttime mode, the mirror can be moved out of the way by a small motor such that camera 14 can have a field of view of things lit by the infrared LEDs. In a generic sense, such an arrangement is similar to a dual day/night security camera. Camera 14 is configured to systematically collect a stream of video frames: half of which can include infrared illumination, as discussed herein.

Figure 2:
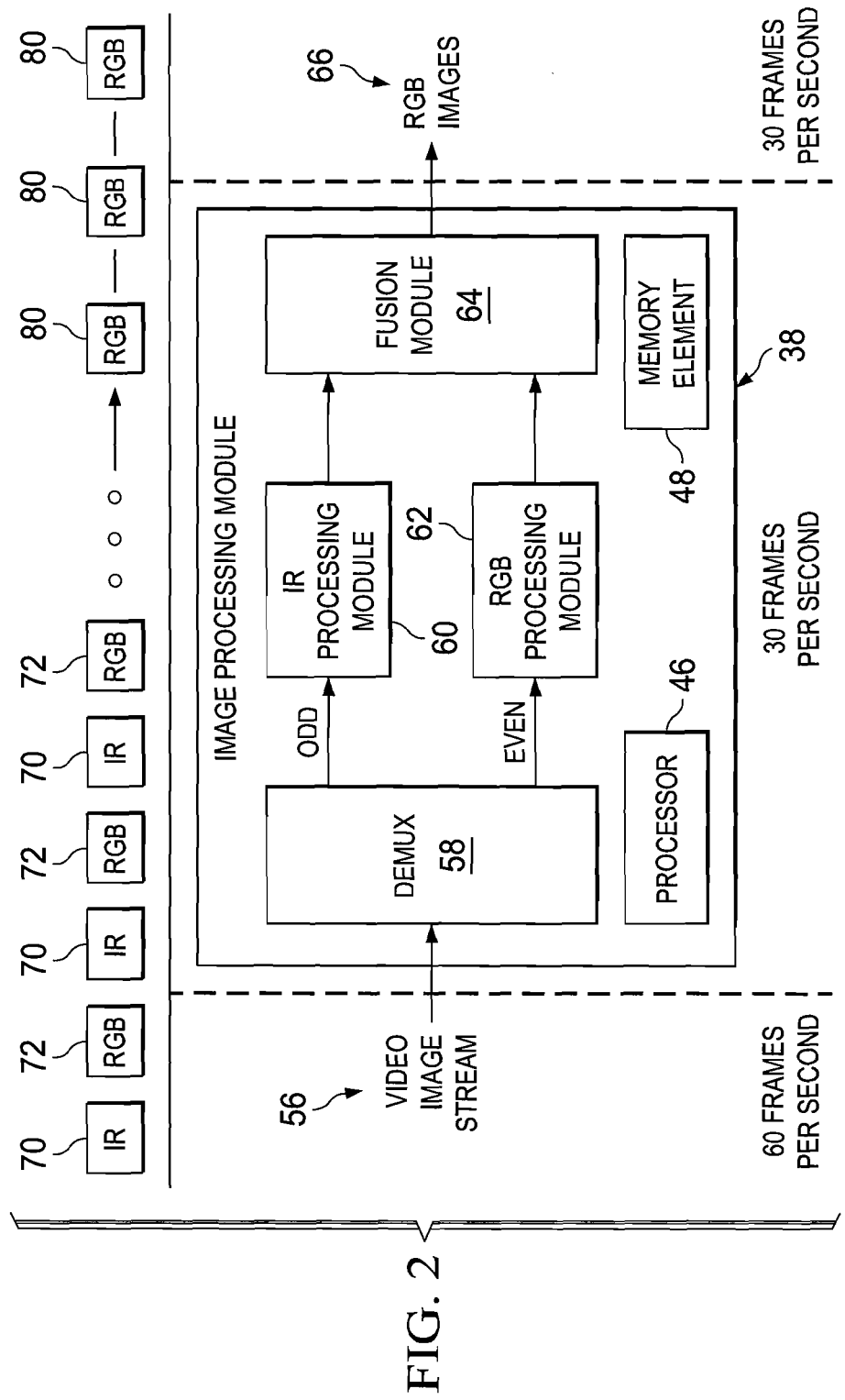
FIG. 2 is a simplified block diagram illustrating one example implementation of an image processing module associated with the system.

FIG. 2 is a simplified block diagram illustrating additional details related to image processing module 38. Image processing module 38 may include a processor 46 and a memory element 48. In this particular example, a video image stream 56 is being sent to image processing module 38 at 60-frames/second, where a demultiplexer (DEMUX) 58 divides the stream into odd and even frames. A dashed line is provided to illustrate how video image stream 56 is divided from 60-frames/second to 30-frames/second. Additionally, the top portion of FIG. 2 illustrates a series of IR frames 70, along with a series of RGB frames 72 propagating through image processing module 38. The resultant of the processing by these elements is shown as a series of RGB frames 80.

An infrared (IR) processing module 60 and a RGB processing module 62 are configured to process video information at 30-frames/second (where such processing by these modules may potentially be executed in parallel). Thus, as a general matter, the next series of processing mechanisms operate at half the speed of the original incoming video image stream 56. In one particular configuration, IR processing module 60 and RGB processing module 62 are digital signal processors (DSPs) configured to perform the operations detailed herein.

Images from IR processing module 60 and RGB processing module 62 are subsequently combined by a fusion module 64, which can further process this data using bilateral filters as discussed below with reference to FIG. 3. Ultimately, the resultant from fusion module 64 can be sent as a series of RGB images 66 to any suitable next destination. In this particular implementation, images are sent at 30-frames/second. In more practical terms, an odd numbered frame could show original noisy RGB images with color having been stretched. An even numbered frame could show an original IR image. The output of the processing executed by IR processing module 60 and RGB processing module 62 reflects a fusing of RGB video with infrared video.

Note that the basic idea of the fusion process it to use the infrared information to find out which parts of the image are smooth and which part of the image are actual edges and textures. Then, the RGB data can be filtered with an edge sensitive filter (e.g., a bilateral filter). In one example scenario, the bilateral filter is sensitive to edges found in the infrared image. Stated otherwise, the infrared can dictate (to the filter) which parts of the image can withstand spatial blurring to illuminate noise (and conversely, which parts cannot withstand spatial blurring). The original image itself is not seen in the output and, instead, the colors are true colors (and not the false color seen by the infrared light imagery).

Camera 14 is configured to generate 60-frames/second (e.g., RGB frames) using its internal frame generator in a particular example of system 10. For example, a vertical synchronization (v-sync) mechanism can be used in such an instance. These frames can be sent to image processing module 38 to generate a new chain of images, which have the qualities of both IR and natural light. The IR strobe could be activated at a time when it equally exposes all lines of the picture. This is a very short time compared to the full exposure time of the frame.

The shudder in camera 14 can be open for any suitable time period (e.g., 16 ms) for each frame. The general notion is that, for each frame, a pulse (a digital signal) is sent to IR illumination elements 24. In essence, the pulse is turning IR illumination elements 24 on for the even numbered frames, and turning it off for the odd numbered frames. A suitable frame strobe can be used to divide the incoming frames (e.g., from 60-frames/second to 30-frames/second).

It should be noted that system 10 has no specific requirement on shutter times. System 10 can be configured to work around the rolling shutter that commonly exists in CMOS sensors. CMOS image sensors typically use a rolling shutter, which means that progressive lines of the picture are exposed and are converted (i.e., analog-to-digital) at different times. This has implications in the use of a strobe. In one example implementation, the strobe of the infrared illumination flash (of illumination elements 24) can be narrowed to be within the vertical blanking time to avoid partial exposure due to the rolling shutter. As a related notion, unequal shutter times can further improve the images propagating through system 10. There could be an uneven exposure for the odd and even frames for camera 14. Longer shutter times can equate to more light energy being received at the sensor, which improves the SNR of the image. For example, instead of a 16 ms interval for RGB and a 16 ms interval for infrared, system 10 can be configured to use 31 ms for RGB and 1 ms for IR (or use any other suitable combination of these time parameters). The IR phase could be configured to be long enough to see the IR flash. This could leave more time for the RGB phase, where the lengthened shutter would improve the RGB image. Before turning to additional details and operational flows of system 10, a brief discussion is provided about some of the infrastructure of FIGS. 1-2.

In one particular example, camera 14 is video camera configured to capture, record, maintain, cache, receive, and/or transmit image data. This could include transmitting packets over IP network 20 to a suitable next destination. The captured/recorded image data could be stored in camera 14 itself, or be provided in some suitable storage area (e.g., a database, a server, etc.). In one particular instance, camera 14 can be its own separate network device and have a separate IP address. Camera 14 could be a wireless camera, a high-definition camera, or any other suitable camera device configured to capture image data.

Camera 14 may interact with (or be inclusive of) devices used to initiate a communication for a video session, such as a switch, a console, a proprietary endpoint, a microphone, a dial pad, a bridge, a telephone, a computer, or any other device, component, element, or object capable of initiating video, voice, audio, media, or data exchanges within system 10. Camera 14 can also be configured to include a receiving module, a transmitting module, a processor, a memory, a network interface, a call initiation and acceptance facility such as a dial pad, one or more speakers, one or more displays, etc. Any one or more of these items may be consolidated, combined, or eliminated entirely, or varied considerably and those modifications may be made based on particular communication needs.

Camera 14 may include image processing module 38 to support the activities associated with enhancing video images through the use of infrared illumination elements 24, as outlined herein. In one implementation, camera 14 includes software to achieve (or to foster) the video image enhancements, as outlined herein in this Specification. Note that in one example, camera 14 can have an internal structure (e.g., with a processor, a memory element, etc.) to facilitate some of the operations described herein. In other embodiments, these video image enhancements features may be provided externally to camera 14 or included in some other device to achieve this intended functionality. In still other embodiments, camera 14 may include any suitable algorithms, hardware, software, components, modules, interfaces, or objects that facilitate the operations thereof.

Display 16 offers a screen at which video data can be rendered for the end user. Note that as used herein in this Specification, the term 'display' is meant to connote any element that is capable of delivering image data (inclusive of video information), text, sound, audiovisual data, etc. to an end user (e.g., audience members 18). This would necessarily be inclusive of any panel, plasma element, television, monitor, computer interface, screen, TelePresence devices (inclusive of TelePresence boards, panels, screens, surfaces, etc.) or any other suitable element that is capable of delivering/rendering/projecting such information. Note also that the term 'image data' is meant to include any type of media or video (or audio-video) data applications (provided in any protocol or format) that could operate in conjunction with display 16. Additionally, and with reference to illumination elements 24, the term 'emit' is meant to include any type of pulsing, flashing, radiating, transmitting, etc. of light energy.

Audience members 18 are simply individuals within the proximity, or within the field of view, of display 16. Audience members 18 can be persons engaged in a video conference involving other individuals at remote site 32. Audience members 18 can be associated with corporate scenarios, consumer scenarios, residential scenarios, etc. or associated with any other suitable environment to which system 10 may be applicable.

IP network 20 represents a series of points or nodes of interconnected communication paths for receiving and transmitting packets of information that propagate through system 10. IP network 20 offers a communicative interface between any of the components of FIG. 1 and remote sites, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. IP network 20 may implement a UDP/IP connection and use a TCP/IP communication language protocol in particular embodiments of the present disclosure. However, IP network 20 may alternatively implement any other suitable communication protocol for transmitting and receiving data packets within system 10.

Server 40 is configured to receive information from camera 14 (e.g., via some connection that may attach to an integrated device (e.g., a set-top box, a proprietary box, etc.) that sits atop display 16 and that includes [or is part of] camera 14). Server 40 may also be configured to control compression activities, or additional processing associated with data received from camera 14. Alternatively, the actual integrated device can perform this additional processing before image data is sent to its next intended destination. Server 40 can also be configured to store, aggregate, process, export, or otherwise maintain image data and logs in any appropriate format, where these activities can involve processor 42 and memory element 44. Server 40 is a network element that facilitates data flows between endpoints and a given network. As used herein in this Specification, the term 'network element' is meant to encompass routers, switches, gateways, bridges, loadbalancers, firewalls, servers, processors, modules, or any other suitable device, component, element, or object operable to exchange information in a network environment.

Server 40 may interface with camera 14 through a wireless connection, or via one or more cables or wires that allow for the propagation of signals between these two elements. These devices can also receive signals from an intermediary device, a remote control, etc. and the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between server 40 and camera 14. Transmissions between these two devices can be bidirectional in certain embodiments such that the devices can interact with each other. This would allow the devices to acknowledge transmissions from each other and offer feedback where appropriate. Any of these devices can be consolidated with each other, or operate independently based on particular configuration needs.

Figure 3:
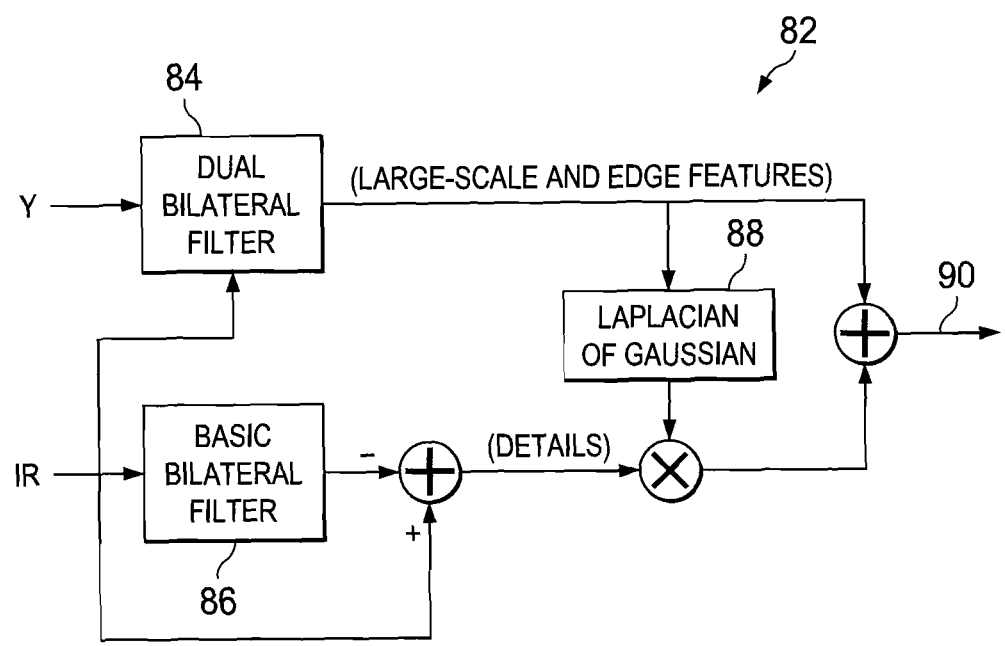
FIG. 3 is a simplified circuit diagram illustrating one example implementation of a fusion module of the system.

FIG. 3 is a simplified circuit diagram 82 of one example internal structure associated with fusion module 64 of FIG. 2. In this particular example, spatial processes in IR/color video fusion are being depicted. FIG. 3 includes a dual bilateral filter 84, a basic bilateral filter 86, a Laplacian of Gaussian (LoG) element 88, and an output 90. As a preliminary matter, it should be noted that a stretching process can be achieved by gamma correction. For example, for each color channel c, where $V_{in}$ and $V_{out}$ are the input and output pixel values, the following can be performed: $V_{out} = V_{in}^{\gamma_c}, \gamma_c > 1$.

Note that this process may simply be accomplished by increasing the gain of camera 14. Using a typical camera setup, increasing the gain under a low-lighting condition is also expected to amplify the noise levels significantly, which can be addressed by a denoising process. Image denoising can be achieved to reduce the temporal and spatial noise of the color video, while preserving motion and edges. A temporal joint bilateral filter can be employed to reduce the temporal noise in a color image. Thereafter, the color space can be converted from RGB to YUV. (YUV is a color space typically used as part of a color image pipeline. The YUV model defines a color space in terms of one luminance (Y) and two chrominance (UV) components.)

The luminance (Y) channel can move through dual bilateral filter 84, which again uses both the color and IR observations, to suppress the spatial noise and the rest of the fusion activity. The chrominance (UV) channels can be simply Gaussian smoothed. In one example implementation, and in an effort to achieve better perceptual quality, processing is performed on the YUV color space directly after the color stretching, where both are treated equally in the denoising process. In other words, each Y/U/V channel can propagate through a joint temporal bilateral filter followed by a dual spatial bilateral filter.

In regards to the detail transfer, this step is aimed to enhance/transfer detail features, which were well captured in the IR image, to the visible one. Unlike that in the flash/no-flash context, where both images are captured in the visible light spectrum, it is not desirable to have features captured in the IR spectrum appear in the visible image. Circuit diagram 82 illustrates a simple approach for providing detail features from the IR image to the luminance channel. To achieve this, basic bilateral filter 86 is applied to the IR image and the result, which represents the large-scale features in the image, is subtracted (to varying degrees) from the input. The output is then added to (or is subtracted from) Y, depending on the LoG response of Y (e.g., performed by LoG element 88).

The processes described above can be conducted without the knowledge of the application context (i.e., video conferencing). A final step in this process relates to improving the perceptual quality of the color image based on an awareness of the context (e.g., in particular, the human face). The objective is to adjust the brightness and color tone of the image toward a more visually pleasing image.

For the color channels (U and V), a Gaussian mixture model can be created using a set of training images, covering different races. For each input frame, which includes the YUV color image from the previous processes and the IR image, face detection can initially be performed using cues from both images (e.g., where face detection is based on the color image). The brightness of the visible image can then be adjusted by processing the Y channel, while the color tone can be adjusted by processing the U and V channels. In both processes, the mapping functions can be created based on the pixels in the facial region, but this could also be applied to all the pixels in the entire image.

By increasing the IR illumination (and potentially in a diffused fashion), a higher-quality IR image can be acquired, which can further improve the final fusion result. Note that just beyond basic bilateral filter 86, infrared video image data can be added (i.e., in a large or a small extent) on a pixel basis. A determination can be made as to how bright an image can be before it is sent to its ultimate destination. Details and edges can be largely smoothed out, where a resultant image (i.e., output 90) is much clearer as a result of the processing. Note that a certain amount of scaling can also occur before the resultant image is generated.

In regards to the computational complexity of the image processing, a majority of the computation in the image processing pipeline is allocated to the multi-spectral video fusion. This is due to the use of bilateral filtering, where a common form of the bilateral filter can be expressed as:

$$BF[I]_p = \frac{1}{W_p} \sum_{q \in \Omega} G_{\sigma_s}(\|p-q\|) G_{\sigma_s}(D(p,q)) I_q \quad (1)$$

$$W_p = \sum_{q \in \Omega} G_{\sigma_s}(\|p-q\|) G_{\sigma_s}(D(p,q)), \text{ and typically} \quad (2)$$

$$D(p,q) = |I_p - I_q| \quad (3)$$

where $G_\sigma$ connotes a zero-mean Gaussian with a standard deviation of $\sigma$. Due to its nonlinearity, bilateral filtering is computationally demanding, particularly so as the size of a kernel increases. The complexity of a simple bilateral filter is $O(|S| \times \sigma_s^2)$, where $|S|$ denotes the number of pixels and $\sigma_s$ is the size of the kernel.

In one example implementation, circuit diagram 82 is associated with a DSP/firmware implementation of the bilateral filters, where lookup tables can be employed for Gaussian calculation. In this case, filtering one pixel based on equations (1)-(3) can translate to a number of operations (additions, multiplications, divisions, and table lookups) for a 3×3 kernel. Dual bilateral filter 84 requires a larger number of operations, in comparison to basic bilateral filter 86. For instance, instead of comparing the intensities of p and q in the visible image, a temporal joint bilateral filter could use intensities in the IR image, and define D(p,q) as a sum of squared differences (SSD) between small spatial neighborhoods Ψ (3×3 or 5×5) around p and q, weighted to favor the kernel's center by Gaussian ω(x, y):

$$D(p,q) = \sum_{(x,y) \in \Psi} \omega(x,y)(I_p - I_q)^2, \quad (4)$$

where $I_p$ denotes the pixel value in the IR image. If an associated memory permits, a given box kernel may be used to speed up the spatial bilateral filters applied on an IR image, while a 3D kernel may be extended for the spatial dual bilateral filter when a larger kernel is needed.

Figure 4:
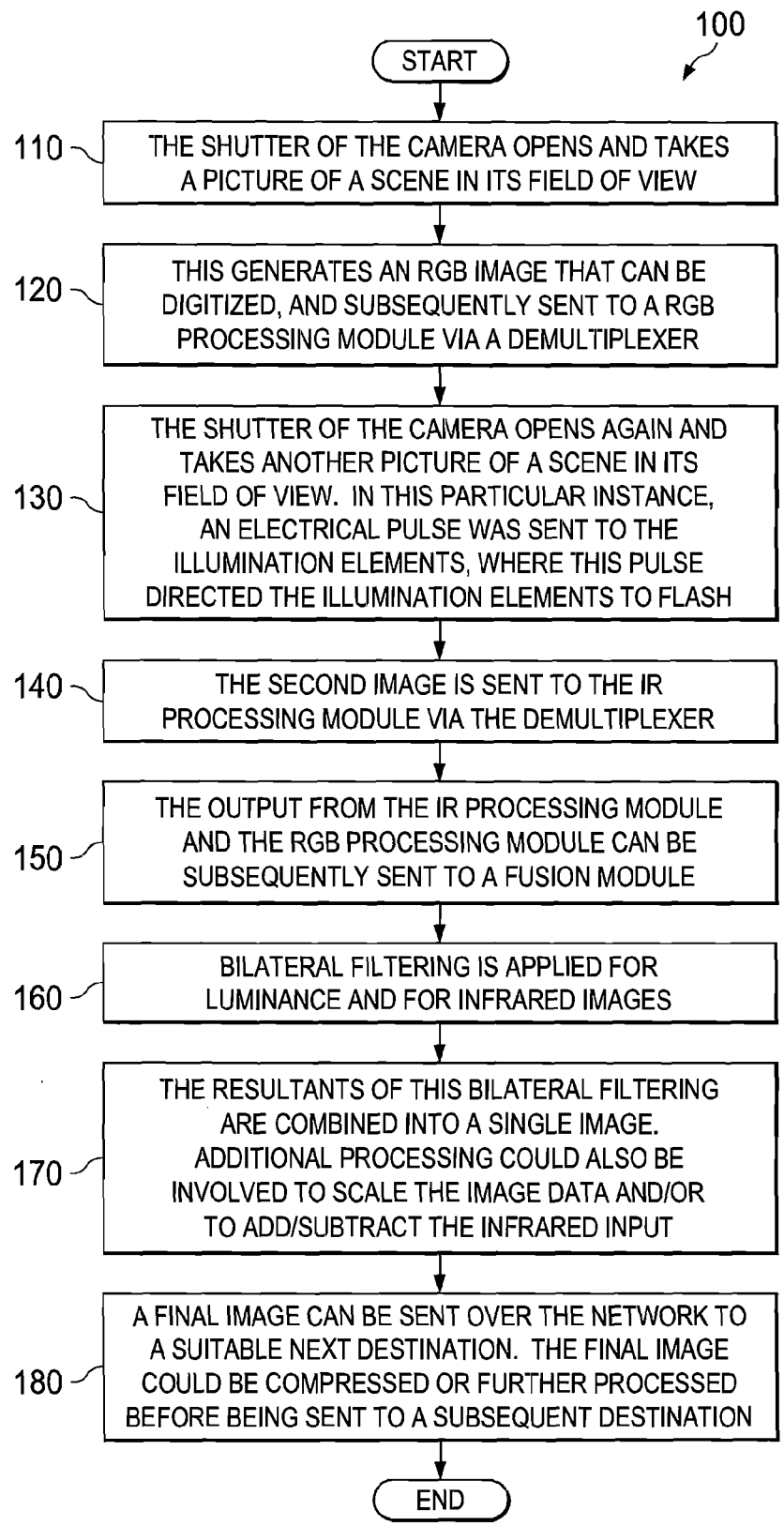
FIG. 4 is a simplified flow diagram illustrating potential operations associated with the system.

FIG. 4 is a simplified flowchart illustrating one example flow 100 associated with system 10. Flow 100 begins at step 110, where the shutter of camera 14 opens and takes a picture of a scene in its field of view. This generates an RGB image that can be digitized at step 120 and, subsequently, sent to RGB processing module 62 via demultiplexer 58. At step 130, the shutter of camera 14 opens again and takes another picture of a scene in its field of view. In this particular instance, an electrical pulse was sent to illumination elements 24, where this pulse directed illumination elements 24 to flash (e.g., with a certain intensity, for a certain duration, etc.). The infrared illumination is invisible to the user. Compared to the previous image, this image is brighter and clearer; however, this image data would not have the color characteristics of the previous image.

The second image is sent to IR processing module 60 via demultiplexer 58 at step 140. The output from IR processing module 60 and RGB processing module 62 can be subsequently sent to fusion module 64 at step 150. Note that the processing in these two elements can occur at 30-frames/second (i.e., half of the incoming frame rate) in this particular scenario. At step 160, bilateral filtering can be applied for luminance and for infrared images. At step 170, the resultants of this bilateral filtering are combined into a single image. Note that a certain amount of processing could also be involved at this juncture in order to scale the image data and/or to add/subtract the infrared input. At step 180, a final image can be sent over the network to a suitable next destination. Note that this final image could be compressed or further processed before being sent to a subsequent destination.

Note that in certain example implementations, the video image enhancement functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, camera 14 (and/or its associated proprietary component, set-top box, etc.) can include memory elements for storing information to be used in achieving the intelligent image enhancement operations, as outlined herein. Additionally, camera 14 may include a processor that can execute software or an algorithm to perform the video image enhancement activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, key, etc.) should be construed as being encompassed within the broad term 'memory element.' Similarly, any of the potential processing elements, modules, and machines described in this Specification should be construed as being encompassed within the broad term 'processor.' Camera 14 can also include suitable interfaces for receiving, transmitting, and/or otherwise communicating data or information in a network environment.

Note that with the example provided above, as well as numerous other examples provided herein, interaction may be described in terms of two, three, or four elements. However, this has been done for purposes of clarity and example only. In certain cases, it may be easier to describe one or more of the functionalities of a given set of flows by only referencing a limited number of elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain server components, system 10 may be applicable to other protocols and arrangements (e.g., those involving any type of video image processing). Additionally, although camera 14 has been described as being mounted in a particular fashion, camera 14 could be mounted in any suitable manner in order to enhance video images. Other configurations could include suitable wall mountings, aisle mountings, furniture mountings, cabinet mountings, upright (standing) assemblies, etc., or arrangements in which cameras would be appropriately spaced or positioned to perform its functions.

Additionally, system 10 can have direct applicability in TelePresence environments such that video image enhancements can occur during video sessions. A TelePresence screen can be used in conjunction with a server in order to intelligently enhance video image data. Also, illumination elements 24 can emit any type of light that could be used in enhancing video image data. For example, illumination elements 24 (instead of using infrared energy) could use other types of light energy that would augment or otherwise improve video image data.

Additionally, certain discussions (above) outline how the image acquisition in a camera can have two phases: an RGB phase and an IR phase. The camera can have two phases with different exposure times, shutter speeds, etc. This is because low light levels are expected during the RGB phase and it is desirable to increase the amount of light. Another feature of the tendered concept is the use of different gains for the image sensor in the camera for the two phases (i.e., the RGB phase and the IR phase). The camera gain could flip back and forth between a higher gain for the RGB phase and a lower gain for the IR phase. This feature could eliminate or supplement the color stretching part of the RGB processing. The gain of the sensor can increase the voltage level coming from the sensor before the A/D. During the RGB phase, the light level may be low, so the voltage is low, and the numbers from the A/D would be low and have a limited dynamic range. By increasing the gain, the signal can use the full dynamic range of the A/D. However, commonly this gain would be high for the IR phase and cause possible overexposure. Thus, for the IR phase, the gain should be lower in certain scenarios. Sensor gain is sometimes denoted as the camera film speed or ISO setting. Moreover, although system 10 has been illustrated with reference to particular elements and operations that facilitate the communication process, these elements and operations may be replaced by any suitable architecture or process that achieves the intended functionality of system 10.

What is claimed is:

1. A method, comprising:
   receiving image data for a field of view associated with a display, wherein the image data is used to generate a red green blue (RGB) frame;
   emitting infrared energy onto the field of view in order to generate an infrared frame, wherein the RGB frame and infrared frame are alternately generated by a single camera and wherein the emitting occurs such that the infrared energy is directed away from the camera and toward the field of view to illuminate the entire field of view; and
   combining the RGB frame with the infrared frame in order to generate a video data stream;
   wherein the emitting of the infrared energy is synchronized with the camera such that the infrared energy is emitted onto the field of view at one half of an existing frame rate of the camera.

2. The method of claim 1, wherein an infrared phase associated with emitting the infrared energy has a shorter exposure time than a RGB phase associated with generating the RGB frame such that the camera has unequal shutter times.

3. The method of claim 1, wherein every other video frame generated by the camera is an infrared frame for which the infrared energy was provided.

4. The method of claim 1, further comprising:
   executing image denoising to reduce temporal noise or spatial noise associated with the RGB frame.

5. The method of claim 1, further comprising:
   adding infrared video image data on a pixel basis to generate enhanced video frames included in the video data stream.

6. The method of claim 1, wherein the emitting infrared energy onto the field of view is provided by an illumination element that comprises light emitting diodes (LEDs), which are covered by a diffuser.

7. Logic encoded in one or more non-transitory tangible media that includes code for execution and when executed by a processor operable to perform operations comprising:
   receiving image data for a field of view associated with a display, wherein the image data is used to generate a red green blue (RGB) frame;
   emitting infrared energy onto the field of view in order to generate an infrared frame, wherein the RGB frame and infrared frame are alternately generated by a single camera and wherein the emitting occurs such that the infrared energy is directed away from the camera and toward the field of view to illuminate the entire field of view; and
   combining the RGB frame with the infrared frame in order to generate a video data stream;
   wherein the emitting of the infrared energy is synchronized with the camera such that the infrared energy is emitted onto the field of view at one half of an existing frame rate of the camera.

8. The logic of claim 7, wherein an infrared phase associated with emitting the infrared energy has a shorter exposure time than a RGB phase associated with generating the RGB frame such that the camera has unequal shutter times.

9. The logic of claim 7, wherein every other video frame generated by the camera is an infrared frame for which the infrared energy was provided.

10. The logic of claim 7, wherein the operations further comprise:

executing image denoising to reduce temporal noise or spatial noise associated with the RGB frame.

11. The logic of claim 7, wherein the operations further comprise:

adding infrared video image data on a pixel basis to generate enhanced video frames included in the video data stream.

12. An apparatus, comprising:
a memory element configured to store data,
a processor operable to execute instructions associated with the data, and
an image processing module configured to:
receive image data for a field of view associated with a display, wherein the image data is used to generate a red green blue (RGB) frame, wherein infrared energy is emitted onto the field of view in order to generate an infrared frame, wherein the RGB frame and infrared frame are alternately generated by a single camera and wherein the emitting occurs such that the infrared energy is directed away from the camera and toward the field of view to illuminate the entire field of view; and
combine the RGB frame with the infrared frame in order to generate a video data stream;
wherein the emitting of the infrared energy is synchronized with the camera such that the infrared energy is emitted onto the field of view at one half of an existing frame rate of the camera.

13. The apparatus of claim 12, wherein an infrared phase associated with emitting the infrared energy has a shorter exposure time than a RGB phase associated with generating the RGB frames such that the camera has unequal shutter times.

14. The apparatus of claim 12, wherein every other video frame generated by the camera is an infrared frame for which the infrared energy was provided.

15. The apparatus of claim 12, wherein the image processing module is further configured to:

execute image denoising to reduce temporal noise or spatial noise associated with the plurality of RGB frames.

16. The apparatus of claim 12, wherein the image processing module is further configured to:

add infrared video image data on a pixel basis to generate enhanced video frames included in the video data stream.

17. The apparatus of claim 12, further comprising:

an integrated component that includes the image processing module, the camera, and an illumination element that is configured to provide the infrared energy onto the field of view, wherein the illumination element further comprises light emitting diodes (LEDs), which are covered by a diffuser.

* * * * *